United States Patent
Neufeld et al.

(10) Patent No.: US 6,639,907 B2
(45) Date of Patent: Oct. 28, 2003

(54) METHOD AND APPARATUS FOR PROCESSING PAGING INDICATOR BITS TRANSMITTED ON A QUICK PAGING CHANNEL

(75) Inventors: Arthur J. Neufeld, San Diego, CA (US); Ehren Van Melle, San Diego, CA (US); De-Gang Richard Yao, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/954,667

(22) Filed: Sep. 14, 2001

(65) Prior Publication Data

US 2002/0093920 A1 Jul. 18, 2002

Related U.S. Application Data

(60) Provisional application No. 60/235,416, filed on Sep. 26, 2000.

(51) Int. Cl.[7] .................... A04B 7/216; A04B 1/38; A04B 1/00; G08C 17/00
(52) U.S. Cl. .................... 370/342; 370/311; 455/574
(58) Field of Search .................... 370/310, 311, 370/313, 328, 329, 335, 342; 455/73, 500, 572, 574

(56) References Cited

U.S. PATENT DOCUMENTS

| | | | |
|---|---|---|---|
| 5,392,287 A | 2/1995 | Tiedemann, Jr. et al. | ... 370/335 |
| 5,491,718 A | 2/1996 | Gould et al. | ............ 320/311 |
| 5,987,056 A | * 11/1999 | Banister | ............ 375/130 |
| 6,016,312 A | * 1/2000 | Storm et al. | ............ 340/7.34 |
| 6,138,034 A | * 10/2000 | Willey | ............ 455/422 |
| 6,300,864 B1 | * 10/2001 | Willey | ............ 340/7.43 |
| 6,453,181 B1 | * 9/2002 | Challa et al. | ............ 455/574 |
| 2002/0025811 A1 | * 2/2002 | Wiley | ............ 455/434 |
| 2002/0054622 A1 | * 5/2002 | Sudo et al. | ............ 375/147 |

FOREIGN PATENT DOCUMENTS

WO      0070792      11/2000

OTHER PUBLICATIONS

Lee, et al., *The Design and Performance Evaluation of High–Speed Packet Data Mac Protocol for CDMA Based IMT2000*: Global Telecommunications Conference, Brazil, Dec. 5–9, 1999, IEEE, US., vol. 5:2694–2698.

* cited by examiner

*Primary Examiner*—Seema S. Rao
*Assistant Examiner*—Kevin C. Harper
(74) *Attorney, Agent, or Firm*—Philip R. Wadsworth; Charles D. Brown; George C. Pappas

(57) ABSTRACT

Techniques to process data sporadically transmitted at designated times in a wireless communication system, such as paging indicator (PI) bits on the quick paging channel in cdma2000. These techniques support a sleep cycle that may start at virtually anytime and having a sleep duration selected based on a fine time increment. The increment is selected such that the finger processors and symbol combiner of a rake receiver may be easily moved to the proper positions upon waking up from a sleep. Techniques are also provided to align the symbol combiner timing to that of a particular multipath in the received signal, if necessary. With these techniques, a terminal may perform a sleep between a pair of assigned PI bits and may wake up and process a single PI bit.

25 Claims, 8 Drawing Sheets

METHOD AND APPARATUS FOR PROCESSING PAGING INDICATOR BITS TRANSMITTED ON A QUICK PAGING CHANNEL

RELATED APPLICATIONS

This application claims the benefit of provisional U.S. application Ser. No. 60/235,416, entitled "METHOD OF PROCESSING QUICK PAGING CHANNEL (QPCH) PAGING INDICATOR (PI) BITS," filed Sep. 26, 2000, which is incorporated herein by reference in its entirety for all purposes.

BACKGROUND

1. Field

The present invention relates to data communication, and more particularly to techniques for processing data sporadically transmitted (if at all) at designated times on a code channel, such as paging indicator bits on a quick paging channel.

2. Background

A terminal in a wireless (e.g., cellular) communication system is typically designed to operate in one of several modes, such as active and standby, at any given moment. In the active mode, the terminal can actively exchange data with one or more base stations (e.g., for a voice or data call). And in the standby mode (which is also referred to as the idle mode), the terminal typically monitors a paging channel for messages addressed to the terminal. Such messages may include those for alerting the terminal to the presence of an incoming call (i.e., page messages) and those for updating system parameters for the terminal (i.e., overhead messages).

During the idle mode, a terminal continues to consume power to sustain the circuitry needed to monitor the signals transmitted from the base stations. Many terminals (e.g., cellular telephones) are portable and powered by an internal battery. The power consumption by the terminal in the idle mode decreases the available battery resources, which then shortens the "standby" time between battery recharges and the "talk" time when a call is placed or received. Therefore, it is highly desirable to minimize the terminal's power consumption in the idle mode to increase battery life.

In one technique for reducing power consumption in the idle mode, messages on the paging channel are sent to a terminal (if at all) at designated times. For IS-95 and cdma2000 systems, the paging channel is divided into numbered "slots", and the terminal may be assigned one or more slots by the base stations with which it has previously established communication. In such a slotted paging channel, the terminal periodically rather than continuously monitors the paging channel for messages from the base stations. The terminal wakes up from an "inactive" state prior to its assigned slot, enters an "active" state and processes the paging channel for messages, and reverts back to the inactive state if additional communication is not required. The terminal remains in the active state (which is also referred to as the "awake" state) if a received message requires the terminal to perform additional actions. In the time period between successive presences in the active state, the terminal is in the inactive state and the base stations do not send any messages to the terminal.

In another technique for further reducing power consumption in the idle mode, a quick paging channel (QPCH) is used to indicate whether or not a page message may be transmitted on the paging channel for a terminal. The quick paging channel includes a number of paging indicator bits that are transmitted as binary On/Off bits. Each terminal is assigned two paging indicator bits for each (80 msec) QPCH slot, with the positions of the assigned paging indicator bits being determined based on a hashing function. The paging indicator bits may be more quickly detected, and if these bits indicate that no message will be transmitted on the paging channel for the terminal, then the terminal would not need to process the paging channel and may enter sleep.

In the inactive state, as much circuitry as possible is typically powered down to conserve power. This may entail removing power to certain analog circuitry (e.g., RF circuits) and gating off the clocks to certain digital circuitry. During a sleep, only a precision oscillator, a sleep timer, and some other necessary circuitry may be kept active.

To process the paging channel in the active state, the terminal needs to acquire and synchronize to the timing of the transmitting base stations. During re-acquisition in the initial part of the active state, the terminal typically searches for strong signal instances (or multipaths) in the received signal and acquires the timing and frequency of each found multipath of sufficient strength. The timing is typically obtained from the phase of a (complex) pseudo-random number (PN) sequence used to spread the data at the base station.

A full search of the entire PN code space for strong multipaths typically requires a long period of time, but would be required if the terminal has no knowledge of the timing of the multipaths when it wakes up from a sleep. To obviate the need for a full search, the digital circuitry is conventionally gated off for a precise duration of time such that the circuitry's timing is approximately aligned with the system timing when the clocks are subsequently gated back on at wakeup.

For IS-95 and cdma2000 systems, a data frame is interleaved over 20 msec and the PN sequence has a duration of 26.67 msec. The shortest time period that is common to both the (20 msec) frame timing and the (26.67 msec) PN timing is 80 msec, which covers four frames and three PN sequences. If the sleep duration is selected to be an integer multiple of 80 msec, then the terminal's timing will be approximately aligned with the system timing when the terminal wakes up from sleep, and only some integer numbers of frames and PN sequences will have elapsed since the terminal enters sleep. With approximately correct timing at wakeup, only a limited search needs to be performed to find and acquire the multipaths. Thus, the sleep duration is conventionally selected to be an integer multiple of 80 msec, or the least common multiple of the frame and PN timing.

A coarse increment of 80 msec for the sleep duration limits the terminal's ability to quickly transition into and out of sleep. Consequently, the terminal spends more time in the active state then necessary to process the required channel. Since power consumption in the active state is typically many times greater than that in the inactive state, any reduction in the amount of time spent in the active state may result in a direct and significant improvement in standby time.

There is therefore a need in the art for techniques to more efficiently process sporadically transmitted data (e.g., paging indicator bits on the quick paging channel) to reduce power consumption.

SUMMARY

Aspects of the invention provide techniques to process data sporadically transmitted (if at all) at designated times in a wireless communication system, such as paging indicator (PI) bits on the quick paging channel (QPCH) and page messages on the paging channel (PCH) in cdma2000. The techniques described herein support a sleep cycle that may start at virtually anytime and having a sleep duration that may further be selected based on a fine time increment (or "sleep quantum"). For example, the sleep quantum may be selected as 512 PN chips (which is 416.6 µsec in cdma2000) for an example design described below.

The techniques described herein ensure that proper timing is maintained for the finger processors and the symbol combiner of a rake receiver typically used to demodulate a received signal in a CDMA system. In an aspect, the sleep quantum may be selected to be an integer multiple of the size of the symbol buffers used in the symbol combiner and an integer multiple of the PN phase shift achievable through "masking". This sleep quantum ensures that the finger processors and symbol combiner may be easily moved to the proper positions upon wakeup from a sleep. Various techniques are also provided herein to align the symbol combiner timing to that of a particular multipath in the received signal, if necessary.

In one specific application, the techniques described herein may be advantageously used to detect PI bits transmitted on the QPCH. With the ability to select a sleep duration in relatively fine increments (e.g., integer multiples of 512 PN chips) and to start the sleep and to wake up at just about any times, the terminal may perform a sleep between a pair of assigned PI bits in the same QPCH slot, or between an assigned PI bit and the start of a PCH slot. With the ability to wake up and process a single PI bit, power consumption is reduced and standby time is extended.

The techniques described herein may be used for various CDMA and wireless communication systems, such as IS-95, cdma2000, and W-CDMA.

The invention further provides methods, apparatus (e.g., terminal), and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
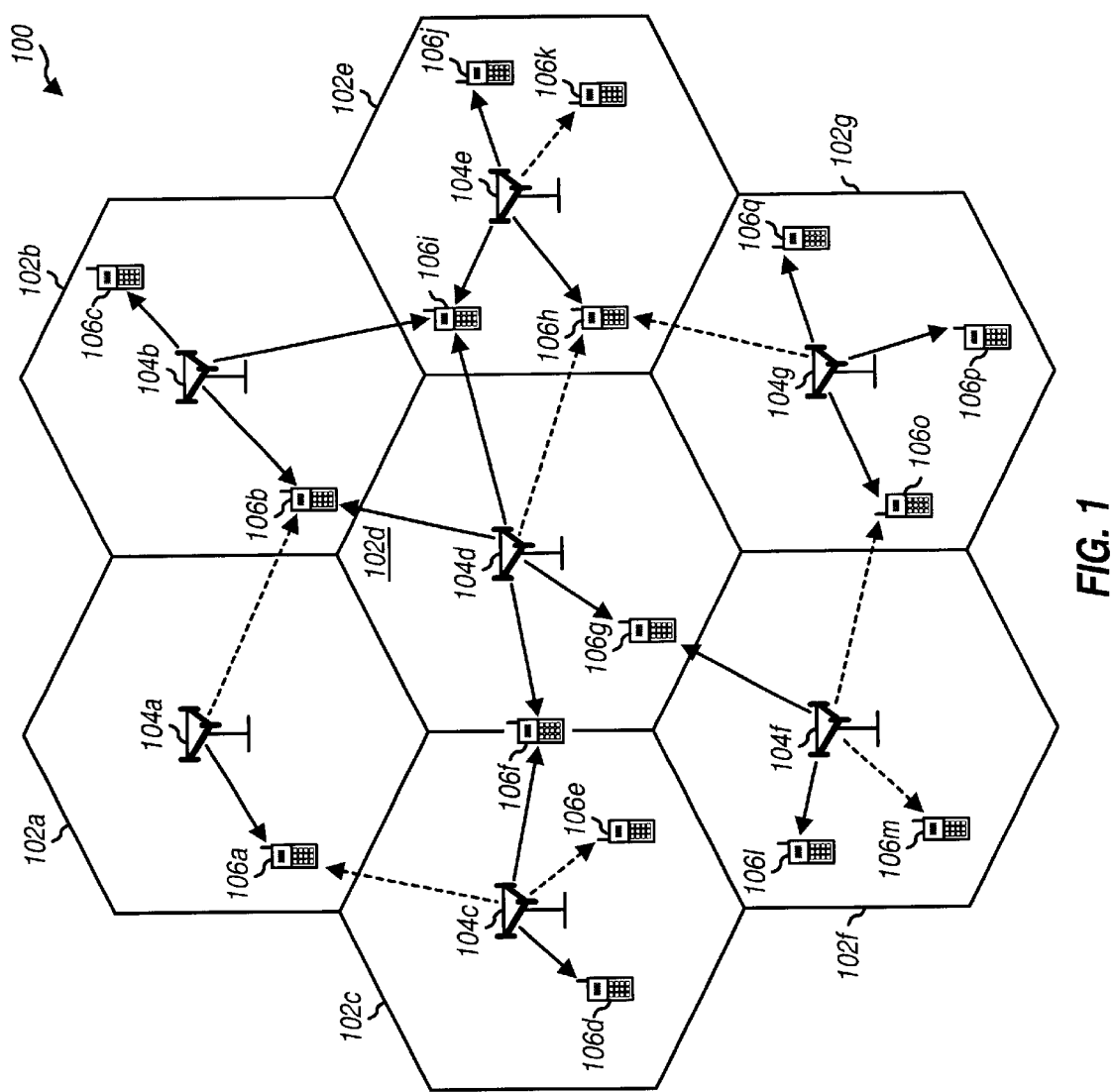
FIG. 1 is a diagram of a wireless communication system with multiple base stations and terminals.

FIG. 1 is a diagram of a wireless communication system 100 wherein various aspects and embodiments of the invention may be implemented. System 100 includes a number of base stations 104 that provide coverage for a number of geographic regions 102. A base station is also referred to as a base transceiver system (BTS) or an access point, and the base station and/or its coverage area are also often referred to as a cell. System 100 may be designed to implement one or more CDMA standards such as IS-95, cdma2000, IS-856, and W-CDMA, and/or some other standards.

As shown in FIG. 1, various terminals 106 are dispersed throughout the system. In an embodiment, each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

In the example shown in FIG. 1, base station 104a transmits to terminal 106a on the forward link, base station 104b transmits to terminals 106b, 106c, and 106i, base station 104c transmits to terminals 106d and 106f, and so on. In FIG. 1, a solid line with an arrow indicates a user-specific data transmission from the base station to the terminal. A broken line with an arrow indicates that the terminal is receiving pilot and other signaling (e.g., paging indicator bits, page messages), but no user-specific data transmission, from the base station. The reverse link communication is not shown in FIG. 1 for simplicity.

Figure 2:
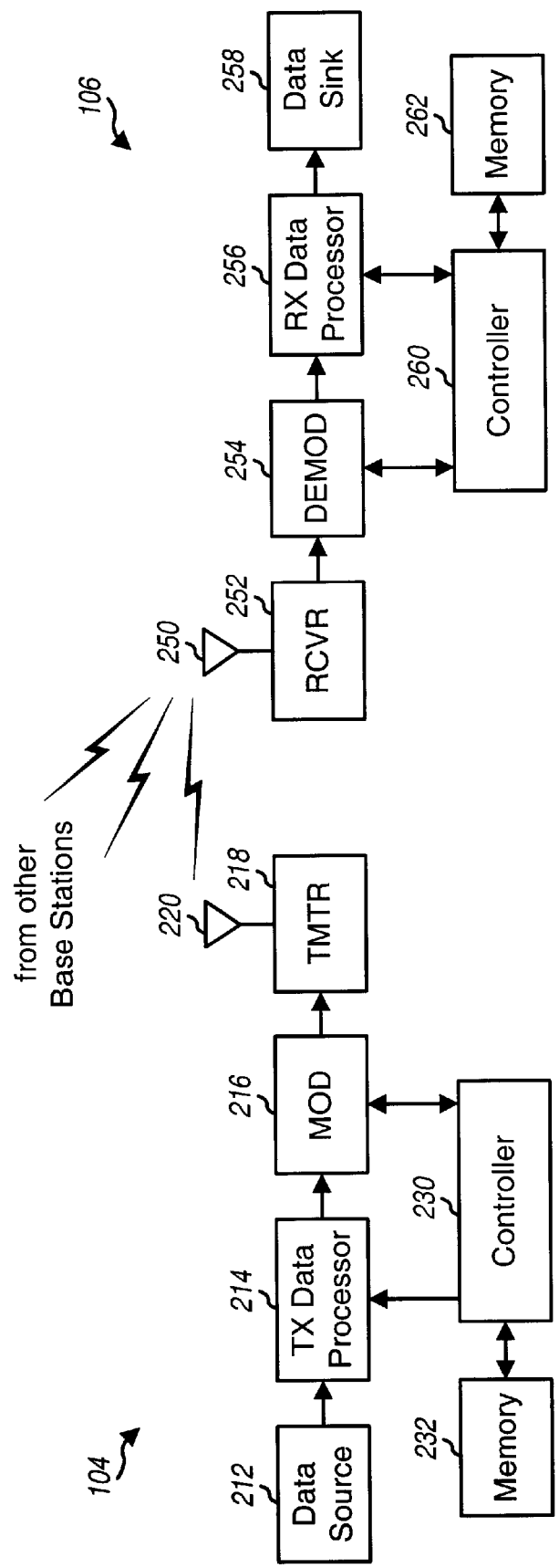
FIG. 2 is a simplified block diagram of an embodiment of a base station and a terminal.

FIG. 2 is a simplified block diagram of an embodiment of base station 104 and terminal 106, which is capable of implementing various aspects and embodiments of the invention. On the forward link, at base station 104, a transmit (TX) data processor 214 receives different types of traffic such as user-specific data from a data source 212, messages (e.g., page messages, paging indicator bits) from a controller 230, and so on. TX data processor 214 then formats and codes the data and messages based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

A modulator (MOD) 216 then receives pilot data and the coded data from TX data processor 214 and further processes the received data to generate modulated data. For IS-95 and cdma2000 systems, the processing by modulator 216 includes (1) covering the coded and pilot data with Walsh codes to channelize the user-specific data, messages, and pilot data onto their respective code channels and (2) spreading the channelized data with a (complex) pseudo-random number (PN) sequence having a particular PN offset assigned to the base station. The modulated data is then provided to a transmitter unit (TMTR) 218 and conditioned (e.g., converted to one or more analog signals, amplified, filtered, and quadrature modulated) to generate a forward modulated signal, which is then transmitted via an antenna 220 and over a wireless link to the terminals.

At terminal 106, the forward modulated signal is received by an antenna 250 and provided to a receiver unit (RCVR)

252. Receiver unit 252 processes (e.g., filters, amplifies, downconverts, and digitizes) the received signal and provides data samples. A demodulator (DEMOD) 254 then receives and processes the data samples to provide recovered symbols. For IS-95 and cdma2000 systems, the processing by demodulator 254 includes (1) despreading the data samples with the same PN sequence used to spread the data at the base station, (2) decovering the despread samples to channelize the received data and messages onto their respective code channels, and (3) coherently demodulating the channelized data with a pilot recovered from the received signal. Demodulator 254 may implement a rake receiver that can process multiple signal instances in the received signal, as described below.

A receive (RX) data processor 256 then receives and decodes the symbols from demodulator 254 to recover the user-specific data and messages transmitted on the forward link. For uncoded data such as the paging indicator bits on the quick paging channel, the recovered symbols from demodulator 254 comprise the recovered data. The processing by demodulator 254 and RX data processor 256 is complementary to that performed by modulator 216 and TX data processor 214 at base station 104, respectively.

Figure 3:
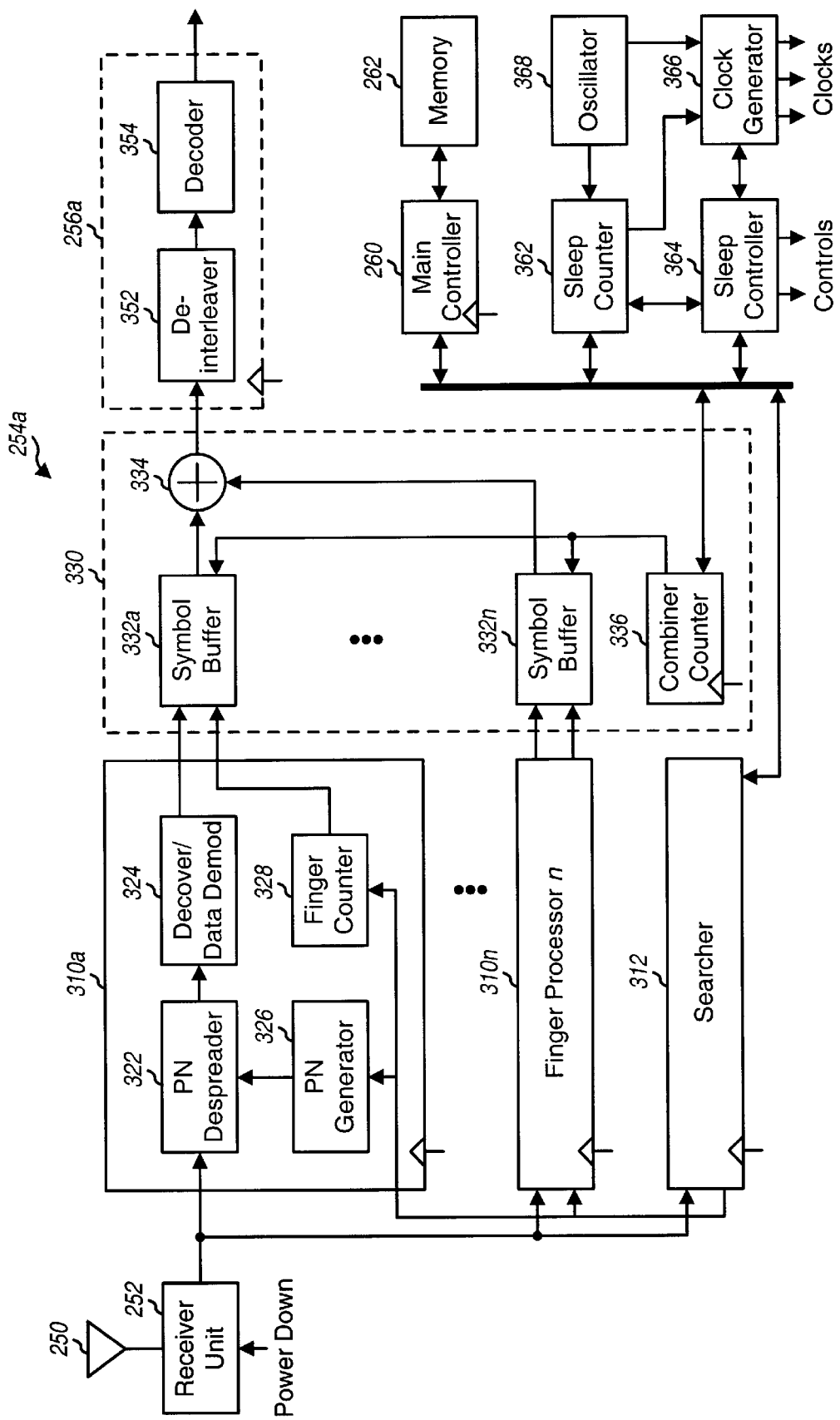
FIG. 3 is a block diagram of an embodiment of a rake receiver and sleep circuitry.

FIG. 3 is a block diagram of an embodiment of a rake receiver 254a capable of receiving and demodulating forward modulated signals transmitted from one or more base stations. Rake receiver 254a includes a number of finger processors 310, a searcher 312, and a symbol combiner 330. Rake receiver 254a may be used to implement demodulator 254 in FIG. 2.

Due to the multipath environment, a forward modulated signal transmitted from a base station may arrive at the terminal via a number of signal paths. The received signal at the terminal may thus comprise multiple instances of the forward modulated signal from each of one or more transmitting base stations. Each signal instance (or multipath) in the received signal is typically associated with a particular magnitude, phase, and arrival time.

Receiver unit 252 conditions (e.g., filters and amplifies) the received signal, quadrature downconverts the conditioned signal, and digitizes the downconverted signal to provide data samples. The data samples are then provided to a number of finger processors 310 and searcher 312.

Searcher 312 is used to search for strong multipaths in the received signal and to provide an indication of the strength and timing of each found multipath that meets a set of criteria. Searcher 312 may be designed with one or multiple searcher units, each of which may be designed to search for multipaths over a respective code space or search window. The searcher units may be operated in parallel to speed up the search operation. Each finger processor 310 may then be assigned to process a respective multipath of interest (e.g., a multipath of sufficient strength, as determined by main controller 260 based on the signal strength information provided by searcher 312).

Within each assigned finger processor 310, the data samples are provided to a PN despreader 322, which also receives from a PN generator 326 a (complex-conjugate) PN sequence corresponding to the PN sequence used at the base station and having a time offset, $t_i$, corresponding to the arrival time of the i-th multipath being processed by the finger processor. PN despreader 322 then despreads the data samples with the locally generated PN sequence to provide despread samples.

To recover the data on a particular code channel, a decoverer/data demodulator 324 first decovers (i.e., multiplies) the despread samples with the same Walsh code used for the code channel and then accumulates the decovered data samples over the length of the Walsh code to provide data symbols. To recover the pilot, the despread samples are decovered with the same Walsh code used to channelize the pilot, accumulated over a particular accumulation time interval, and filtered to provide pilot estimates. Decoverer/data demodulator 324 then demodulates the data symbols with the pilot estimates to generate demodulated symbols, which are then provided to a symbol buffer 332 associated with the finger processor.

A finger counter 328 within each finger processor 310 is used as a write address generator for the associated symbol buffer 332. Finger counter 328 may be implemented as a wrap-around counter that counts the length of the PN sequence (which is $2^{15}$ for IS-95 and cdma2000) and then "rolls over" or "wraps around" each time the end of the PN sequence is reached. Finger counter 328 is reset with the same PN chip offset provided to PN generator 326 (which corresponds to that of the assigned multipath) and is incremented by one for each PN chip. The output of finger counter 328 is used as a write index or address for the associated symbol buffer 332.

Each symbol buffer 332 receives and temporarily stores the demodulated symbols from the associated finger processor 310. Each buffer 332 has a size that is selected based on various considerations such as the expected worse case delay spread between the earliest and latest arriving multipaths. In one specific implementation, each buffer 332 is designed as a circular buffer capable of storing eight symbols, although some other buffer sizes may also be used and are within the scope of the invention. If each data symbol is generated by accumulating decovered data samples for 64 PN chips, then the 8-symbol buffer size effectively covers a time duration of 512 PN chips.

Since each multipath has a different propagation delay and arrival time, the like-indexed symbols from the assigned finger processors 310 are written to the associated symbol buffers 332 at different times. At each chip time, the like-indexed symbols from all buffers 332 for the assigned finger processors 310 are provided to a summer 334 for combining. Thus, buffers 332 are also often referred to as "deskew" buffers.

A combiner counter 336 is used as a read address generator for symbol buffers 332. Combiner counter 336 may also be implemented as a wrap-around counter that counts an integer multiple of both the frame and PN timing (e.g., 80 msec) and then wraps around. Combiner counter 328 is delayed by a particular number of PN chips (e.g., 256 or 384 PN chips) from a particular finger counter 328 (e.g., the one for the finger processor assigned to the earliest arriving multipath). The output of combiner counter 336 is used as a read index or address for buffers 332.

Summer 334 receives and combines the time-aligned like-indexed symbols from symbol buffers 332 for each chip time to provide a recovered symbol. RX data processor 256a then receives the recovered symbols from summer 334 and de-interleaves and decodes the symbols to provide decoded data and messages. The pilot demodulation and symbol combining may be achieved as described in U.S. Pat. No. 5,764,687 patent, which is incorporated herein by reference.

Symbol combiner 330 also typically maintains the system time for the terminal. The symbol combiner timing may be derived from combiner counter 336, which may be adjusted slowly or abruptly "slammed" (i.e., reset) based on the timing of a designated finger processor 310, as described below.

Main controller 260 may be designed to direct the demodulation and decoding processes and to control the sleep for the hardware. If no code channel needs to be processed, then main controller 260 may send to a sleep controller 364 a command to go to sleep and may correspondingly provide to a sleep counter 362 a value indicative of the duration of the sleep. Sleep controller 364 then starts sleep counter 362 and further generates various control signals to direct various hardware elements to enter sleep. For example, sleep controller 364 may send a disable signal to a clock generator 366 to direct the gating off of the clocks, and may send a power down signal to certain analog components within receiver unit 252. Using an oscillator 368 as a precision clock source, sleep counter 362 counts down the sleep duration and provides a wakeup signal upon reaching the countdown value. Sleep controller 364 and clock generator 366 receive the wakeup signal and powers on the analog circuitry and re-enables the clocks, respectively.

The inventive techniques described herein may be used generally to process any type of sporadically transmitted data in a wireless communication system. For clarity, various aspects and embodiments of the invention are described specifically for the quick paging channel and the paging channel in cdma2000.

Figure 4:
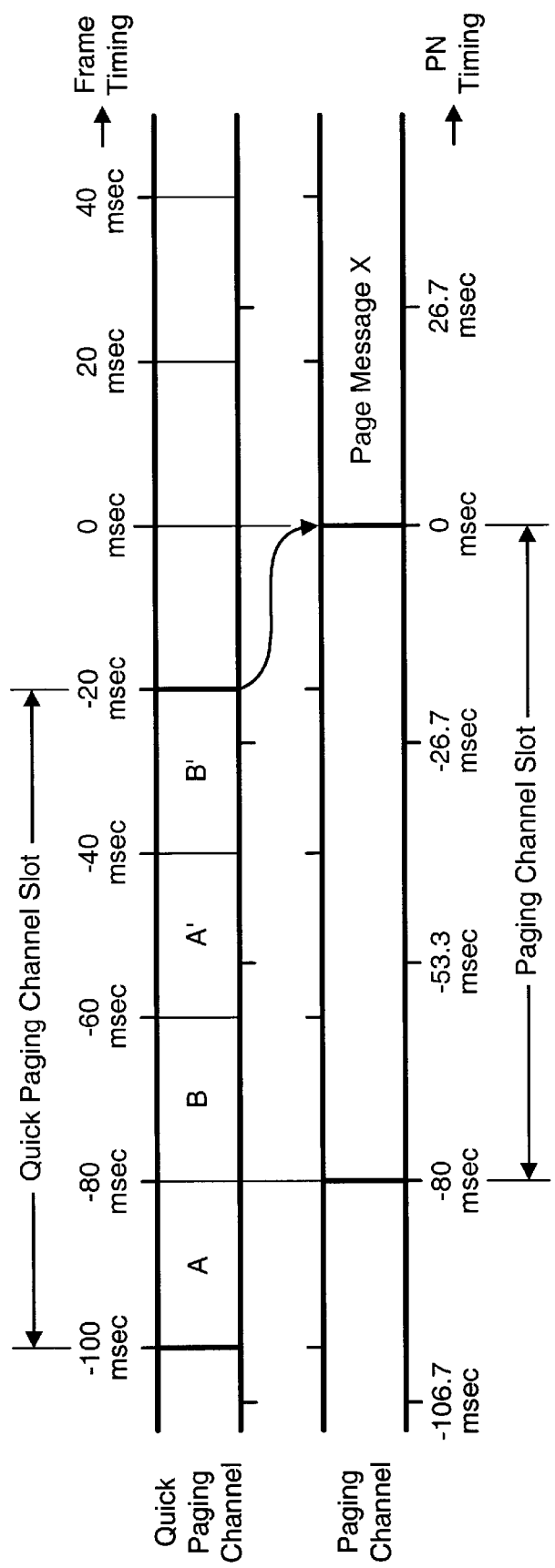
FIG. 4 is a diagram of the quick paging channel (QPCH) and the paging channel (PCH) defined by cdma2000.

FIG. 4 is a diagram of the quick paging channel (QPCH) and the paging channel (PCH) defined by cdma2000. The PCH is used to transmit page messages to the terminals in standby mode. Because a page message may be relatively long and can appear at any time, continual monitoring of the PCH for page messages may significantly deplete battery power in the standby mode. The QPCH and PCH are thus designed such that the terminals need only be active for only a portion to the time to receive the page messages.

In cdma2000, the paging channel is partitioned into PCH slots, each of which has a duration of 80 msec. Each PCH slot is further partitioned into four 20 msec frames. A group of terminals may be assigned to each PCH slot, with the assignment being based on some identification information for the terminals such as, for example, the International Mobile Subscriber ID (IMSI) which is unique for each terminal, the Mobile Identification Number (MIN), the Electronic Serial Number (ESN), or the Temporary Mobile Subscriber ID (TMSI). The paging channel may be used to transmit coded messages to "idle" terminals (i.e., those that have registered with the system but are in standby mode).

In cdma2000, the quick paging channel is partitioned into QPCH slots, each of which also has a duration of 80 msec. Each QPCH slot is further partitioned into four frames labeled as A, B, A', and B', and each frame includes either 96 or 192 paging indicator (PI) bits depending on whether 9.6 kbps or 19.2 kbps rate is used for the QPCH. Each PI bit is an On/Off keyed bit (i.e., a "0" or "1" bit value, with "0"=Off and "1"=On). Each registered terminal is assigned two PI bits for each assigned QPCH slot, with the assigned QPCH slots being the ones starting 100 msec before the assigned PCH slots. The position of each assigned PI bit is determined based on a defined hashing function and changes from bit to bit. Of the pair of assigned PI bits for each assigned QPCH slot, one PI bit is transmitted in frame A and the second PI bit is transmitted in frame A', or one PI bit is transmitted in frame B and the second PI bit is transmitted in frame B'. This transmission scheme ensures that the two PI bits are separated by a minimum of 20 msec, and that the second and later PI bit arrives a minimum of 20 msec before the start of the PCH slot associated with the QPCH slot. The PI bits for a terminal may be viewed as one type of data that is sporadically transmitted at designated times.

The QPCH is used in conjunction with the PCH and functions like a control channel for the PCH. Each QPCH slot is associated with a corresponding PCH slot, but is transmitted 100 msec before the associated PCH slot. The PI bits on the QPCH are quick paging signals that alert the terminals that a coded page message is about to be transmitted on the PCH in the associated PCH slot.

When a base station sends a page to a terminal on the PCH (or requires the terminal to wake up to receive new configuration information), the base station turns "On" both PI bits assigned to the terminal for the QPCH slot. Since more than one terminal may hash to, and be assigned with, any given PI bit, detecting the assigned PI bits as "On" does not guarantee that the terminal will actually receive a page message (or configuration information) in the associated PCH slot. However, a PI bit detected as an "Off" bit may be interpreted to mean that the terminal does not need to process the associated PCH slot for paging or other information, which may greatly reduce power consumption since the page message is coded and may be long.

To properly process the QPCH, PCH, or any other code channel, each of which is spread with the PN sequence prior to transmission, a terminal needs to acquire the timing of the multipath being processed. This is typically achieved by correlating the data samples for the received signal with the locally generated PN sequence at various chip or sub-chip offsets. If the locally generated PN sequence is time-aligned with that of the multipath, then a high correlation value is obtained. A finger processor may be assigned to process the multipath and would then track the timing of the multipath as it drifts over time (e.g., due to changing link conditions).

As noted above, the clocks to the demodulator and decoder hardware are typically gated off while the terminal is asleep. When the clocks are re-applied after the terminal wakes up, the timing of the demodulator and decoder hardware may not be aligned with that of the multipath if care is not used in selecting the duration of the sleep. For example, the finger processors (i.e., the PN generators and finger counters), the searcher, the symbol combiner (i.e., the combiner counter), and the de-interleaver may be misaligned when the demodulator and decoder hardware is turned back on. Moreover, if the sleep duration is not an integer multiple of the PN sequence length, then correlation of the data samples with the locally generated PN sequence results in a low value due to timing misalignment.

A sleep cycle is also conventionally initiated on a well-defined boundary such as a PN roll occurrence in the symbol combiner. The PN sequence used to spread the data prior to transmission has a fixed length (e.g., 32,768 chip) but is continually repeated to generate a continuous spreading sequence. A "PN roll" refers to the occurrence of a repetition of the PN sequence (i.e., the PN sequence restarting at the first PN chip index of 0 after hitting the last PN chip index of 32,767). For IS-95 and cdma2000, a PN roll occurs every 26.67 msec. A "sleep cycle" is often used in the art to refer to the entire sleep procedure, including possibly waking up periodically without turning on the receiver, demodulator, and decoder hardware in order to check for external events such as key presses, connection and disconnection from a car-kit, head-set, computers, and so on.

Conventionally, the sleep duration is selected to be an integer multiple of both the frame timing and the PN timing. For cdma2000, this is 80 msec, which is the duration of four data frames or three PN sequences. With a sleep duration that is an integer multiple of 80 msec, the demodulator and decoder hardware is unaffected by the gating off of the clocks and maintains their underlying alignment to the PN sequence and deinterleaver framing despite being gated-off for the duration of the sleep. Specifically, for such a sleep duration, the values of counters 328 and 336 and PN generator 326 would approximately coincide with the timing of the received signal immediately after waking up from a sleep. However, this coarse increment of 80 msec for the sleep duration limits the ability of the terminal to efficiently perform sleep. The increment for the sleep duration is also referred to as a "sleep quantum".

A "quarter roll timeline" has recently been explored whereby four finger processors are assigned to PN sequences that are offset from one another by a quarter PN sequence length (or 6.67 msec). This results in one of the four finger processors rolling over its PN sequence each 6.67 msec. The symbol combiner can then "slam" to a PN roll on one of the finger processors, which would then aligned the symbol combiner timing to that finger processor's timing. Moreover, sleep controller 364 may be set to begin sleep when the "slam" to the finger processor's PN roll takes effect. This "slam-to-sleep" technique reduces the sleep quantum to 6.67 ms. However, the sleep cycle would conventionally still need to be initiated on a well-defined boundary such as a PN roll in the symbol combiner.

Aspects of the invention provide techniques to process any channel whereby data may be transmitted sporadically (if at all) but at known times. These techniques may be advantageously used to process the PI bits on the QPCH and the page messages on the PCH in cdma2000. The techniques described herein support a sleep cycle that may start at virtually anytime and having a sleep duration may further be selected based on a fine sleep quantum. For example, the sleep quantum may be selected as 512 PN chips (which is 416.6 $\mu$sec in cdma2000) for an example design described below, or may possibly be selected to be an even smaller value for some other designs.

As noted above, the two PI bits assigned to a terminal are transmitted within an 80 msec QPCH slot but separated by at least 20 msec, and the second PI bit is transmitted 20 to 60 msec before the start of the associated PCH slot. Moreover, these two PI bits are each only 104.2 or 208.3 $\mu$sec long, depending on whether the 19.2 kbps or 9.6 kbps rate is used for the QPCH. If a sleep quantum of 80 msec is used for the sleep duration, then the terminal may need to be awake for the entire QPCH slot to decode both PI bits. And if a sleep quantum of 26.67 msec or 6.67 msec is used for the sleep duration, this is still a long time period relative to the short duration of the PI bits. A substantial amount of battery power may be conserved if an even shorter sleep quantum may be used, e.g., one in which the terminal can wake up just long enough to detect the PI bits.

Various timing considerations are addressed in order to support a small sleep quantum. First, the sleep quantum is selected such that the finger processors and searcher may be quickly moved to the proper PN phase when the terminal wakes up from a sleep. Second, the sleep quantum is selected such that the symbol combiner may also be quickly moved to the proper position. Both of these considerations are described in further detail below.

Searcher and Finger Timing

Figure 5A:
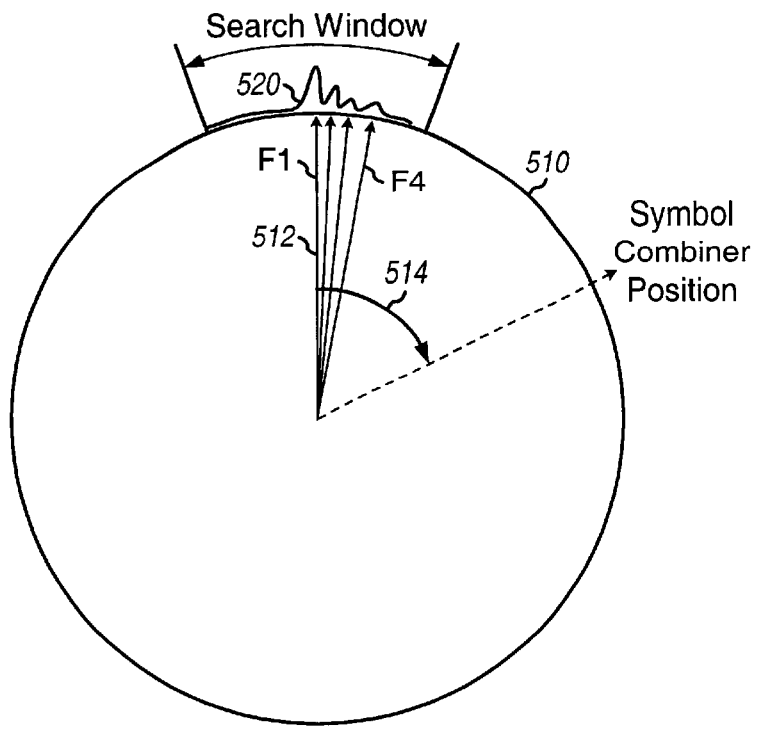
FIGS. 5A through 5C are diagrams of a PN circle with a received signal prior to a sleep, after waking up from the sleep, and after re-acquisition upon wakeup, respectively.

FIG. 5A is a diagram of a circle that represents the entire code space for the PN sequence. The PN sequence has a specific data pattern and a fixed length of 32,768 chips, with each chip of the PN sequence being assigned a respective PN chip index. The start of the PN sequence is assigned a PN chip index of 0 and the last chip of the PN sequence is assigned a PN chip index of 32,767. The PN sequence may be viewed as being placed on a circumference 510 of the circle, with the start of the PN sequence being aligned to the top of the circle (i.e., PN chip index of 0 is at the location pointed to by a line 512). Although not shown in FIG. 5A, circumference 510 is partitioned into 32,768 evenly spaced points, with each point corresponding to a respective PN chip index. The length of the PN sequence is traversed by moving around the PN circle in a clockwise direction along circumference 510.

As shown in FIG. 5A, a received signal 520 may include a number of multipaths, which are represented as peaks in the received signal. Each multipath is associated with a respective arrival time at the terminal. To find a particular multipath, the data samples for the received signal are correlated with the locally generated PN sequence at various chip or sub-chip offsets. Due to the pseudo-random nature of the PN sequence, the correlation of the data samples with the PN sequence should be low, except when the phase of the locally generated PN sequence is aligned with that of the multipath, in which case the correlation results in a high value. The range of chip offsets to be searched forms a search window. In the example shown in FIG. 5A, four multipaths are found in the received signal, and four finger processors are assigned to process these multipaths. The timing of the earliest arriving multipath is often used as the system time for the terminal.

As also shown in FIG. 5A, the position of the symbol combiner is offset from that of the earliest arriving multipath by a particular number of PN chips, which is represented by an arrow 514. This offset between the symbol combiner position and the earlier arriving multipath may be, e.g., 256 or 384 PN chips, and this is not shown to scale in FIG. 5A.

Figure 5B:
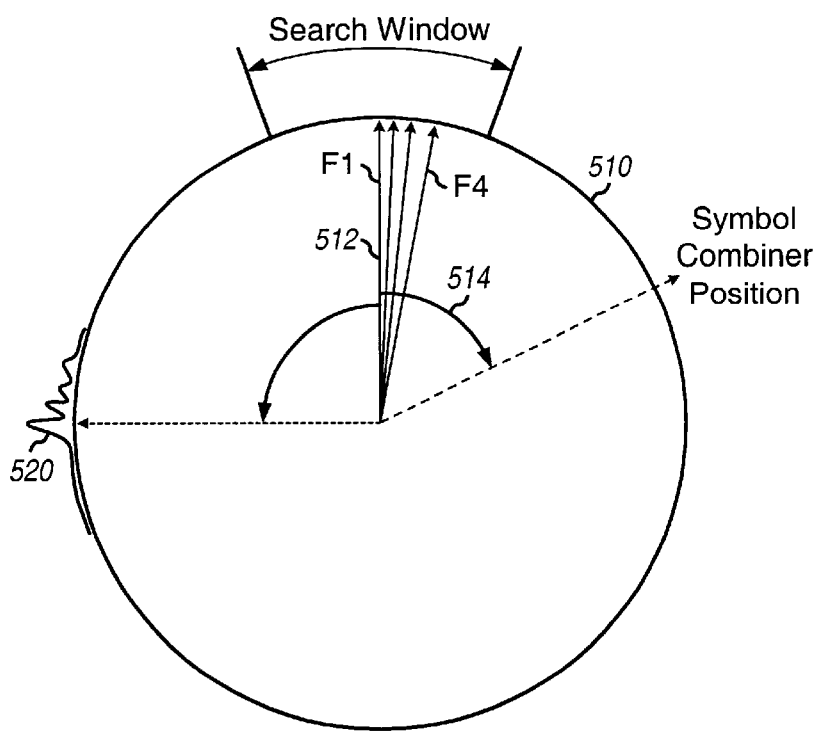

FIG. 5B is a diagram of the PN circle after waking up from a sleep. When the sleep duration is a non-integer multiple of the PN sequence length (i.e., non-multiple PN rolls), the multipaths appear to have shifted around the PN circle in proportion to the fractional PN roll part of the sleep duration, relative to the timing of the finger processors. In the example shown in FIG. 5B, the sleep duration is (L+¼) PN rolls, where L in an integer. The multipaths are thus shifted by ¼ PN roll (i.e., the fractional part), which is ¼ counter-clockwise on the PN circle.

Figure 5C:
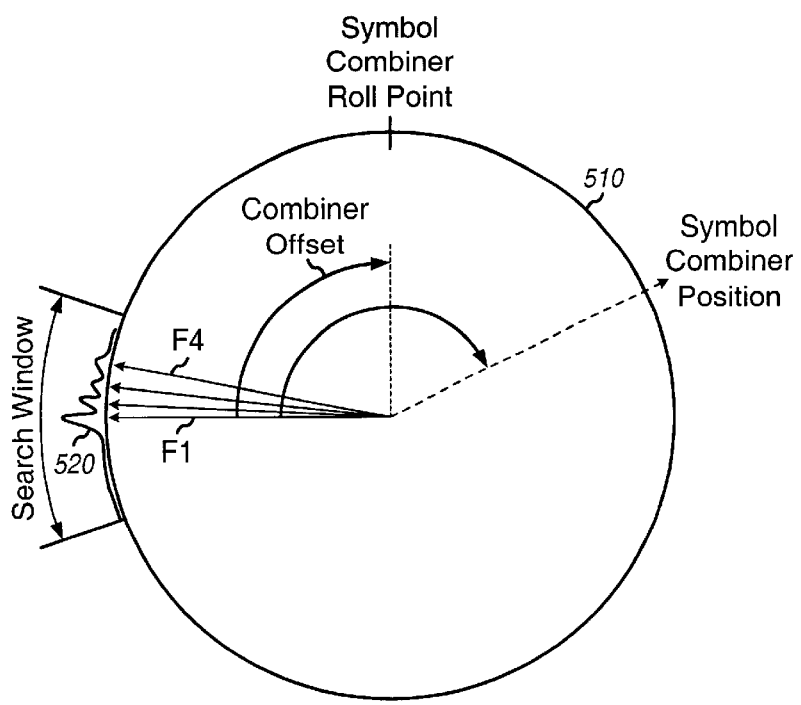

FIG. 5C is a diagram of the PN circle after the finger processors have been shifted to their proper PN phases, after waking up from a sleep, to account for the fractional PN roll part of the sleep duration. To compensate for the shift in the multipaths due to a sleep duration with a fractional PN roll, the PN generators in the searcher and the finger processors may be shifted by the same amount and in the same direction as the fractional PN roll (e.g., ¼ counter-clockwise on the PN circle for the example shown in FIG. 5B). This PN phase shift may be achieved by "slewing", "masking", or a combination of both.

With slewing, the linear sequence shift register (LSSR) used to generate the PN sequence may be moved in the forward or reverse direction by manipulating the clock applied to the LSSR. For example, if the LSSR is operated at the chip rate, then the LSSR may be slewed backward one PN chip by skipping a clock pulse, and may be slewed forward one PN chip by inserting an additional clock pulse (i.e., double clocking the LSSR once). In an embodiment, the terminal is designed with the ability to slew the finger processors anywhere on the PN circle within a particular time period (e.g., approximately 2 msec). This allows the finger processors to be slewed to the proper position in a relatively short time period, which then properly positions the PN rolls.

With masking, the "primary" PN sequence generated by the LSSR is provided to a mask circuit that also receives an N-bit mask, where N=15 for IS-95 and cdma2000. The mask circuit then generates a shifted PN sequence having a phase that is shifted relative to the phase of the received PN sequence. The amount of phase shift is determined by the value of the applied mask. Masking may thus be used to cause the phase of the primary PN sequence to effectively "jump" to a new phase. The LSSR and mask circuit may be implemented as described in U.S. Pat. No. 5,228,054, which is incorporated herein by reference.

Masks may be generated to provide PN phase shifts of any increment. However, since the PN sequences assigned to the base stations in cdma2000 systems are offset in phase from one another by an integer multiple of 64 PN chips, masks capable of generating PN sequences separated by 64 PN chips are typically stored for use to shift the PN sequence to the desired phase. Masks that can shift the PN sequence in increments of less than 64 PN chips (e.g., 32, 16, or 8 PN chips) may also be stored. However, each time the increment size is reduced by a factor of two (e.g., from 64 down to 32 PN chips), twice as many masks are needed and the storage requirement approximately doubles.

Masking and slewing may also be used in combination to provide PN sequence with any desired phase in less time. Masking may be used to adjust the phase of the PN sequence in coarse increments (e.g., 64-PN chip increments). Slewing may thereafter be used to adjust the PN phase in fine increments (e.g., ⅛ PN chip increments) to the desired phase. Masking can thus be advantageously used to account for a large phase adjustment that would otherwise take more time to accomplish via slewing.

In an embodiment, to avoid the need to slew the PN generators to the proper PN chip offsets after waking up from a sleep, the sleep duration may be selected to be an integer multiple of the masking increment (e.g., multiple of 64 PN chips).

In an embodiment, to obtain certain benefits as described below, slewing is used for the finger processors and masking is used for the searcher.

Symbol Combiner Timing

As noted above, the symbol combiner may be used to provide the system time for the terminal, and its timing is typically derived from the earliest arriving multipath. The combiner counter may be used to provide the symbol combiner timing and may be adjusted slowly or abruptly slammed based on the timing or a particular finger processor. As used herein, a "slam" is a reset (to zero or some other specified value) of the (typically 80 msec) symbol combiner timing to a known reference time, which is typically triggered by a PN roll event on a designated finger processor (e.g., the one assigned to process the earliest arriving multipath).

The main controller may enable or disable the slam and may further select the particular finger processor to slam to. Besides the quick change in timing due to a slam, the symbol combiner timing is typically specified to change smoothly, if at all (e.g., ⅛ chip change in symbol combiner timing for each 160 msec). Techniques are provided herein to obtain the proper symbol combiner timing after a sleep of a non-integer multiple PN roll.

Sleep duration with a fractional PN roll affects the symbol combiner timing. In an embodiment, the combiner counter is not corrected after waking up from a sleep. Rather, the fraction PN roll part for the sleep is added to a "virtual symbol combiner" offset. The system time may then be obtained by adding the virtual symbol combiner offset to the value from the combiner counter. This technique is described in further detail in U.S. patent application Ser. No. 09/540,302, entitled "Symbol Combiner Synchronization after a Jump to a New Time Alignment," filed Mar. 31, 2000, assigned to the assignee of the present application and incorporated herein by reference. If alignment of the symbol combiner timing to the received signal timing is required, then a slam to the finger processor for the earliest arriving multipath may be performed, assuming that the PN roll position for the this finger processor has been properly set (e.g., by slewing and/or masking).

Figure 6:
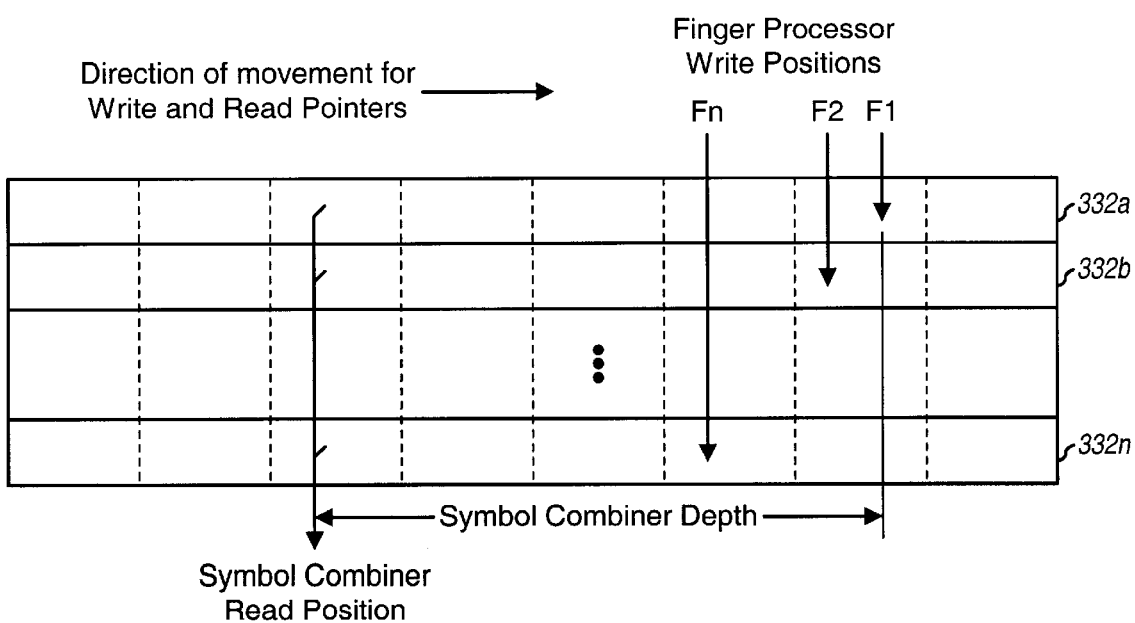
FIG. 6 is a diagram that graphically illustrates the write and read timing for the symbol buffers within the rake receiver.

FIG. 6 is a diagram that graphically illustrates the write and read timing for the symbol buffers. As noted above, the symbol buffers are typically implemented as circular buffers, and their write and read pointers are advanced in the same direction (e.g., to the right in FIG. 6) for each write and read, respectively. The symbol combiner depth is the distance between the write position of the earliest arriving multipath and the read position for all buffers. The read position is also referred to as the symbol combiner read position, or simply, the symbol combiner position.

Sleep duration with a fractional PN roll also affects the symbol buffer write and read pointers. The write and read positions (or addresses) for the symbol buffers are provided by the finger counters and the combiner counter, respectively, as shown in FIG. 3. When the finger counters are moved to the proper PN phases after waking up from a sleep (e.g., by slewing the PN generators of the finger processors around the PN circle to their proper PN phases), the write positions in the symbol buffers are also moved correspondingly. This then affects the symbol combiner depth. The proper symbol combiner depth may be maintained after waking up from a sleep based on various schemes.

In a first scheme, the PN generators in the finger processors are slewed around the PN circle in an integer multiple of the symbol buffer size. If each symbol buffer is implemented as a circular buffer (e.g., of eight symbols), then slews that are integer multiples of 512 PN chips result in the same write positions as before. If the read position is not changed after a sleep, then the symbol combiner depth remains unchanged.

In a second scheme, the symbol combiner read position may be moved to the proper symbol combiner depth by forcing the symbol combiner to slam to the PN roll of the finger processor assigned to the earliest arriving multipath. This may be achieved by moving the finger processor's PN generator to a position that will trigger a PN roll, which is then used for the symbol combiner slam. The proper PN phase needed by this finger processor to process the assigned multipath may be obtained by masking the (slewed) PN sequence.

In a third scheme, the sleep quantum is selected to be equal to an integer multiple the symbol buffer size, and the sleep duration is correspondingly quantized to be an integer multiple of the symbol buffer size. For this scheme, the write and read positions would be effectively unchanged after waking up from a sleep, and the symbol combiner depth is also maintained. This scheme avoids the need for a slam of the symbol combiner to obtain the desired symbol combiner depth after the sleep. For the example symbol buffer design described above and having a size of eight symbols, the sleep quantum may be selected to be 512 PN chips or 416.7 μsec.

An "instant" sleep may thus be performed based on the small sleep quantum and the ability to start the sleep cycle at just about any time. This instant sleep reduces the amount of time the terminal needs to be awake to process the QPCH and PCH, which then reduces power consumption and increases standby time.

Processing PI Bits on the QPCH

Various schemes may be used to process the PI bits on the QPCH and the page messages on the PCH. Some schemes are described below, and others may also be contemplated and are within the scope of the invention.

In a first scheme, the terminal processes both PI bits on a given QPCH slot to determine whether or not to process the associated PCH slot. For this scheme, if both PI bits are detected as Off bits that indicate that no page message will be transmitted for the terminal, then the PCH is not processed. Otherwise, if either PI bit is detected as either an erasure or an On bit that indicates that a page message may be transmitted for the terminal, then the PCH is processed. An erasure is declared for a PI bit that is not reliably detected. This condition may be indicated by (1) the detected energy for the PI bit being below a first energy threshold used to indicate an On bit but greater than a second energy threshold used to indicate an Off bit, and/or (2) the detected energy for the received pilot being below a third energy threshold. This scheme reduces the likelihood of missed page messages, but also consume more power.

In a second scheme, the terminal skips the processing of the PCH if either detected PI bit indicates that no page message will be transmitted for the terminal. For this scheme, the terminal does not process the second PI bit if the first PI bit is detected as an Off bit.

In a third scheme, the terminal uses the first reliably detected PI bit to determine whether or not to process the PCH. For this scheme, the terminal processes the second PI bit only if the first PI bit is detected as an erasure.

In a fourth scheme, the terminal only processes a PI bit if it is estimated that the bit may be reliably detected. This estimation may be based on the QPCH channel, the pilot channel, or some other channel. If each of the two PI bits is either not processed or detected as an erasure, or if one of the PI bits is detected as an On bit, then the terminal processes the PCH.

In a fifth scheme, the terminal detects a single PI bit (either the first or second PI bit), and then processes the PCH accordingly based on the detected PI bit.

In a sixth scheme, the terminal ignores the PI bits on the QPCH and wakes up to process the PCH regardless.

In general, the terminal may be designed to process the PCH if the detected/undetected PI bits are inconclusive as to whether or not a page message may be transmitted for the terminal in the upcoming PCH slot.

Figure 7:
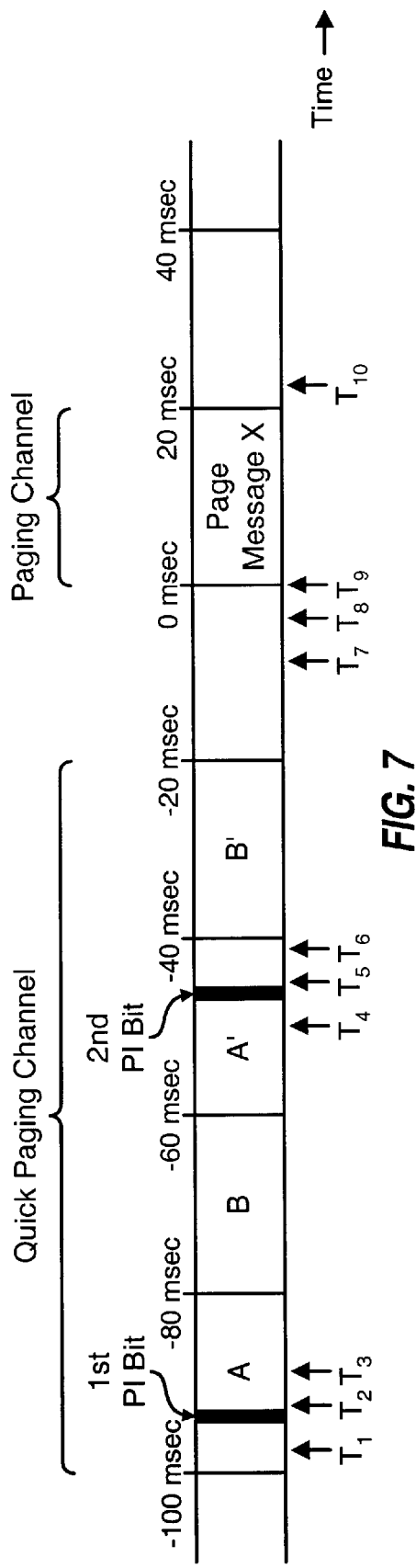
FIG. 7 is a diagram of a timeline for processing the QPCH and PCH, in accordance with an embodiment of the invention.

FIG. 7 is a diagram of a timeline for processing the QPCH and PCH, in accordance with an embodiment of the invention. In this embodiment, the terminal is able to start sleep at almost any point in time (i.e., at discrete points in time that are finer than the boundaries for the ¼ PN roll, 26.67 msec timing, or 80 msec timing) and is also be able to sleep for a duration that is determined based on a small sleep quantum (e.g., of 512 PN chips). This allows the terminal to sleep between the pair of assigned PI bits in a given QPCH slot, and to also sleep between the second PI bit and the start of the associated PCH slot, as described below.

At time $T_1$, the terminal wakes up for its first PI bit on the QPCH and prepares to re-acquire the multipaths. This preparation may entail masking the PN generator for the searcher and slewing the PN generators for the finger processors to the proper PN phases based on the fractional PN roll part of the last sleep period. Slewing may be used for the finger processors to allow the finger processors to subsequently generate PN rolls at the proper times, if masking does not achieve this by design. Since the PN rolls of the finger processors (and not the searcher) may be used for a symbol combiner slam, slewing may thus be advantageously used for the finger processors and masking may be used for the searcher. In any case, the QPCH is then processed by the finger processors and the first PI bit assigned to the terminal is detected, at time $T_2$. The terminal then prepares for sleep until the next required wakeup time, and enters sleep at time $T_3$.

For the second scheme described above, the terminal wakes up to process the second PI bit only if the first PI bit is detected as either an On bit or an erasure. Otherwise, if the terminal detects the first PI bit as an Off bit (indicating that no page message will be transmitted for the terminal in the next PCH slot), then it sleeps until the time $T_1$ prior to the first PI bit in the next QPCH slot assigned to the terminal.

If the terminal needs to process the second PI bit, then it wakes up at time $T_4$ and prepares to re-acquire the multipaths. This preparation may again entail masking the searcher PN generator and slewing the finger processor PN generators to the proper PN phases based on the fractional PN roll part of the last sleep period between times $T_3$ and $T_4$. The QPCH is then processed by the finger processors and the second PI bit assigned to the terminal is detected, at time $T_5$. The terminal then prepares for sleep until the next required wakeup time, and enters sleep at time $T_6$.

For the second scheme described above, the terminal wakes up to process the PCH only if the second PI bit is detected as either an On bit or an erasure, and otherwise sleeps until the first PI bit in the next assigned QPCH slot.

If the terminal needs to process the PCH, then it wakes up at time $T_7$ and prepares to re-acquire the multipaths. This preparation may again entail masking the searcher PN generator and slewing the finger processor PN generators to the proper PN phases based on the fractional PN roll part of the last sleep period between times $T_6$ and $T_7$. The finger processors are then assigned to the multipaths, and the PCH timing, frame timing, and PN timing are prepared to be reset to the timing of the received PCH, at time $T_8$.

At time T9, the (80 msec) PCH timing, (20 msec) frame timing, and (26.67 msec) PN timing are all reset (or slammed) based on the timing of the finger processor for the earliest arriving multipath. The decoder is also initialized to the proper state (e.g., the Viterbi decoder is initialized to an appropriate starting state). The PCH is then processed to recover the page message transmitted on the channel. Upon decoding the first frame of the page message, the terminal may be able to determine whether or not the message is addressed to it and/or if additional processing is required. If the terminal does not need to continue processing the PCH or to perform any other actions, then it prepares for sleep until the next required wakeup time (which is the first PI bit in the next assigned QPCH slot), and enters sleep at time $T_{10}$.

Numerous schemes may be used to process sporadically transmitted data such as that on the QPCH and PCH. As examples, several schemes for detecting the PI bits on the QPCH at times $T_2$ and $T_5$ are described below. Other schemes for processing sporadically transmitted data may also be implemented and are within the scope of the invention.

In a first scheme (also referred to as an "online" scheme), a search is initially performed to find strong multipaths, and the finger processors are then assigned to the found multipaths. The assignment should be sufficiently far ahead of the desired PI bit in order to properly detect the signal strength of the PI bit. Since each PI bit is transmitted as an On/Off keyed bit, the value of the transmitted PI bit may be detected by determining the energy of the PI bit (e.g., using a received signal strength indicator (RSSI), as is known in the art), and comparing the detected energy against a particular energy threshold.

In a second scheme (also referred to as an "offline" scheme), data samples in a small time window around the desired PI bit are captured and stored to a sample buffer. The search for multipaths, the assignment of the finger processors, and the detection of the PI bit are then performed based on the data samples stored in the sample buffer. The use of the sample buffer may further reduce the amount of time the analog circuitry (e.g., RF circuitry) needs to be turned on. For example, the interval between times $T_1$ and $T_3$ and the interval between times $T_4$ and $T_5$ may be shortened, which consequently increases the sleep duration, reduces power consumption, and increases standby time.

For sleeps of short durations, the amount of circuitry that may be turned off may be dependent on the duration of the sleep and the requirements of the circuitry. For example, certain RF circuits may require a relatively long time period (e.g., over 10 msec) to properly warm up. If the sleep duration is shorter than the warm-up requirement of a particular circuit, then that circuit may be left on for the duration of the sleep. For example, if the two PI bits are close together, or if the 2nd PI bit is close to the start of the associated PCH slot, then there may be insufficient time to perform a full sleep whereby the RF circuits are turned off. In this case, the RF circuits may be left on, and only the demodulator and decoder hardware may be turned off to conserve power. Alternately, the demodulator and decoder hardware may also be left on, in which case no slewing or masking would be required.

Sleep Cycle

Figure 8:
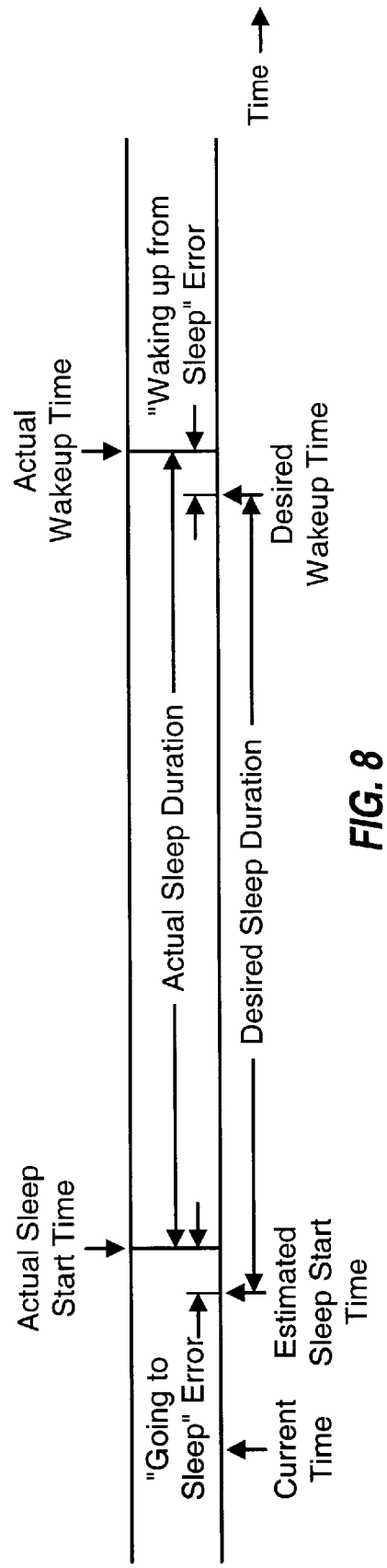
FIG. 8 is a diagram of a sleep cycle.

FIG. 8 is a diagram of a sleep cycle, in accordance with an embodiment of the invention. Before the sleep controller enters a sleep cycle, the duration of the sleep is determined based on the current time and the time the terminal needs to wake up (e.g., the time for the next PI bit or the start of the upcoming PCH slot). A particular amount of time is typically needed to prepare for sleep (e.g., to determine the sleep duration, generate the control signals for the hardware, and so on). This preparation time may be a variable amount of time, in which case it may be estimated. An estimated sleep start time may then be determined as the current time plus the estimated preparation time. The sleep duration may be determined as the desired wakeup time minus the estimated sleep start time.

The clocks to the demodulator and decoder hardware are disabled for the entire sleep duration. If the clocks are still applied to the demodulator and decoder hardware after the estimated sleep start time (e.g., because the actual preparation time is longer than estimated), then an error results between the actual sleep start time and the estimated sleep start time. The actual hardware timing (when the clocks are actually disabled) will then be ahead of the expected hardware timing (which assumes that the clocks would be disabled at the estimated sleep start time). A complementary phenomenon occurs at wakeup, and the clocks are not applied to the hardware until slightly after the desired wakeup time. This then results in an error between the actual wakeup time and the desired wakeup time. Since the "going to sleep" error is equal to the "waking up from sleep" error, the hardware timing is as expected when the clocks are re-applied.

To avoid waking up later than desired, as shown in FIG. 8, the preparation time may be estimated as the worse case preparation time for all expected operating situations.

If the converse occurs and the actual sleep start time is earlier than the estimated sleep start time (e.g., because the actual preparation time is shorter than estimated), then the actual hardware timing (when the clocks are disabled) will be behind of the expected hardware timing. However, a complementary phenomenon occurs at wakeup and cancels the "going to sleep" error. Since the two errors are equal, the hardware timing is as expected when the clocks are re-applied.

Waking Up from Instant Sleep

Certain tasks are typically performed when waking up from a sleep. An interrupt signal may be provided to the main controller to indicate a wakeup from sleep. The main controller would then use this interrupt signal as an indication to initiate the re-acquisition process. For some terminal hardware designs, this interrupt signal is generated when a PN roll occurs in the symbol combiner, which may be delayed by four or six symbols from the earliest arriving finger.

If the terminal is operated to sleep on a PN roll, as is conventionally done, then the above-described hardware would produce a PN roll interrupt signal at wakeup, as the clocks are turned back on. This interrupt signal would inform the main controller that, since the clocks are back on, the re-acquisition process may be commenced.

With an "instant" sleep, the terminal does not need to sleep on a PN roll. Hence, for the above hardware design, a PN roll interrupt signal is not generated when the clocks are turned back on if a PN roll has not occurred. In particular, the hardware timing may be such that it is a particular time period (e.g., 5 msec) from a PN roll when it was put to sleep. When the clocks are re-applied to the hardware at wakeup, the PN roll would then occur after this particular time period (e.g., 5 msec) later, and the PN roll interrupt signal would not be generated until this PN roll occurs. To avoid wasting this time period waiting for the next PN roll, a different signal may be used to inform the main controller to commence re-acquisition at wakeup.

In a first scheme, additional hardware is provided to generate an interrupt signal when the clocks are turned back on at wakeup. This interrupt signal may be generated, for example, by clock generator 366 and provided directly to controller 260 in FIG. 3. This scheme may be implemented on new hardware designs, but may not practical for existing hardware designs.

In a second scheme, the extra time before the next PN roll may be absorbed into the warm-up period for the RF circuitry. For example, if the warm-up period for the RF circuitry is 30 msec and the hardware went to sleep 20 msec before a PN roll, then the programmed warm-up time may be reduced to 10 msec (i.e., 30 msec–20 msec). In this case, 10 msec after wakeup, the sleep controller would enable the clocks and the demodulator hardware would then be operational. Then after 20 msec, the PN roll interrupt signal would be generated by the demodulator hardware and would coincide approximately with the end of the RF warm-up period. At this point, the main controller can commence re-acquisition and the RF circuitry is also ready. This scheme may be used if the RF warm-up time exceeds the "wait-for-next-PN-roll" time.

In a third scheme, the searcher is programmed to generate an interrupt shortly after waking up from sleep. Prior to going to sleep, the searcher may be programmed to perform a small search. The sleep controller then turns off the clocks, which causes the searcher state to freeze. When the sleep controller re-enables the clocks, the searcher continues operation, completes the small search previously programmed prior to the last sleep, and generates a dump interrupt. The main controller would disregard the search result, but can interpret from the search dump interrupt that the clocks have been turned back on. The small search should be long enough to ensure that the sleep controller turns off the clocks (and disables the searcher) before the search completes, but as short as possible so that the main controller is informed of the re-enabled clocks as soon as possible after wakeup.

Figure 9:
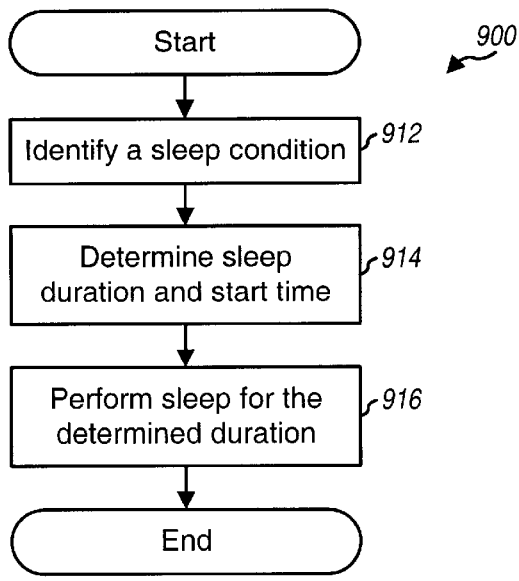
FIG. 9 is a flow diagram of a process to perform a sleep.

FIG. 9 is a flow diagram of a process 900 to perform a sleep, in accordance with an embodiment of the invention. Initially, a sleep condition is identified, at step 912. Sleep may be triggered by various conditions and events such as, for example, if the time difference between the current time and the next processing time is equal to or longer than a particular time threshold. In an aspect, this time threshold may be less than a quarter PN roll (i.e., less than a quarter PN sequence length).

If the sleep condition is identified, then the sleep duration and sleep start time are determined, at step 914. The sleep duration may be a non-integer multiple of a PN roll and the fractional part of the sleep duration may be less than a quarter PN roll. The sleep duration and sleep start time may be determined as described above. At step 916, the terminal then performs a sleep for the determined duration and starting at approximately the determined start time.

The techniques described herein may be advantageously used to detect the PI bits transmitted on the QPCH. With the ability to select a sleep duration in relatively fine increments (e.g., integer multiples of 512 PN chips) and to start the sleep and to wake up at just about any times, the terminal may perform a sleep between a pair of assigned PI bits on the same QPCH slot, or between an assigned PI bit and the start of a PCH slot. With the ability to wake up and process a single PI bit, power consumption is reduced and standby time is extended.

Figure 10:
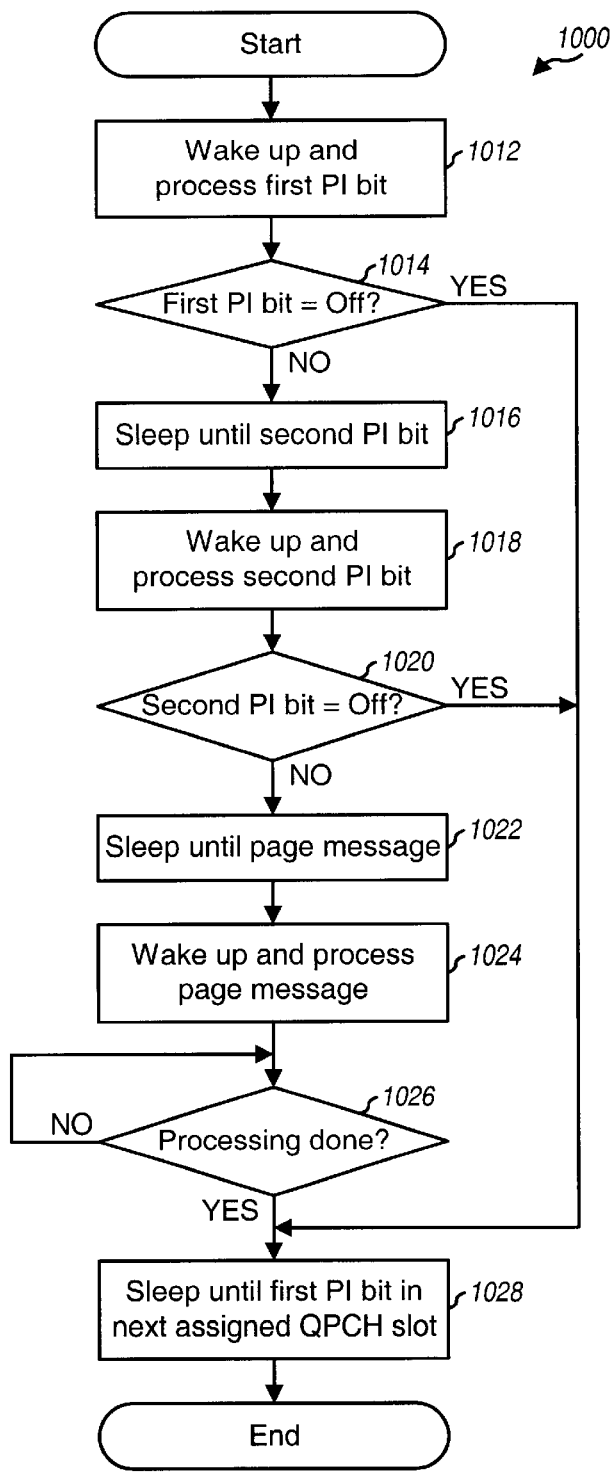
FIG. 10 is a flow diagram of a process to detect the PI bits on the QPCH, in accordance with an embodiment of the invention.

FIG. 10 is a flow diagram of a process 1000 to detect the PI bits on the QPCH, in accordance with an embodiment of the invention. Process 1000 generally conforms to the timeline shown in FIG. 7. Initially, the terminal wakes up and processes the first PI bit, at step 1012. If the first PI bit is detected as an Off bit, as determined in step 1014, then the process proceeds to step 1028. Otherwise, the terminal performs a sleep until the second PI bit on the same QPCH slot, at step 1016. This short duration sleep is achievable using the techniques described herein.

At step 1018, the terminal wakes up and processes the second PI bit. If the second PI bit is detected as an Off bit, as determined in step 1020, then the process proceeds to step 1028. Otherwise, the terminal performs a sleep until the start of the associated PCH slot, at step 1022. The terminal then wakes up and processes the page message on the associated PCH slot, at step 1024. If the received message indicates that additional actions need to be performed, as determined at step 1026, then the terminal remains in step 1026 and continues to process the paging channel and/or performed the required actions. Otherwise, the terminal performs another sleep until the first PI bit in the next assigned QPCH slot, at step 1028. The process then terminates.

The techniques described herein may be used to sleep from one PI bit to another PI bit, from a PI bit to the start of a PCH slot, and from the PCH slot to a PI bit. These techniques may be used for QPCH operation when a terminal monitors the PCH. As noted above, these techniques may be used for other types of sporadically transmitted data. For example, a terminal may also monitor broadcast messages, which occur in Broadcasts slots that (like PCH slots) start on 80 msec boundaries. However, the Broadcast slots (currently) do not have indicator bits in the QPCH starting 100 msec before the Broadcast slot. Using the techniques described herein, if a PI bit is detected as zero, the access terminal may sleep for some particular period of time and wakeup for a Broadcast slot.

For clarity, various aspects and embodiments of the invention have been specifically described for IS-95 and cdma2000. The techniques described herein may also be used for other CDMA and wireless communication systems. For example, these techniques may be used in W-CDMA systems, which also support a paging indicator channel (PICH) used to transmit paging indicators to the terminals (which are referred to as user equipment (UE) in W-CDMA). Various differences exist between cdma2000 and W-CDMA, and the techniques described herein may be modified for use in W-CDMA. For example, W-CDMA uses a scrambling sequence (instead of PN sequence) of length 38,640 chips for spreading data prior to transmission.

The techniques described herein may be implemented by various means. For example, the techniques may be implemented in hardware, software, or a combination thereof. For a hardware implementation, the elements used for performing sleep and processing the various types of sporadically transmitted data may be implemented within one or more application specific integrated circuits (ASICs), digital signal processors (DSPs), digital signal processing devices (DSPDs), programmable logic devices (PLDs), controllers, micro-controllers, microprocessors, other electronic units designed to perform the functions described herein, or a combination thereof.

For a software implementation, the elements used for performing sleep and processing the various types of sporadically transmitted data may be implemented with modules (e.g., procedures, functions, and so on) that perform the functions described herein. The software codes may be stored in a memory unit (e.g., memory 262 in FIG. 2) and executed by a processor (e.g., main controller 260 and/or sleep controller 364). The memory unit may be implemented within the processor or external to the processor, in which case it can be communicatively coupled to the processor via various means as it known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing QPCH paging indicator bits to conserve power and extend standby in a CDMA communication system, comprising:

identifying a sleep condition; and triggering sleep start at an arbitrary instant, thus eliminating the use of finger rolls to force a roll event in a symbol combiner.

2. In a wireless communication system, a method for processing data transmitted at designated times on a particular code channel, comprising:

identifying a sleep condition; and performing a sleep of a duration that is a non-integer multiple of a length of a PN sequence used to spread the data prior to transmission, wherein a fractional part of the sleep duration is less than a quarter PN sequence length.

3. The method of claim 2, wherein the data corresponds to paging indicator bits transmitted on a quick paging channel (QPCH).

4. The method of claim 3, wherein the sleep is performed between a pair of paging indicator bits in a particular QPCH slot.

5. The method of claim 2, wherein the data corresponds to a page message transmitted on a paging channel (PCH).

6. The method of claim 2, wherein the data corresponds to a broadcast message transmitted on a broadcast channel.

7. The method of claim 2, wherein the sleep duration is selected as an integer multiple of a time increment that is less than a quarter of the PN sequence length.

8. The method of claim 7, wherein the time increment is selected based on masks used for masking the PN sequence.

9. The method of claim 7, wherein the time increment is selected based on the size of buffers used to store symbols.

10. The method of claim 7, wherein the time increment is selected as an integer multiple of 64 PN chips.

11. The method of claim 10, wherein the time increment is selected as 512 PN chips.

12. The method of claim 2, wherein the performing the sleep includes removing clocks to demodulator and decoder hardware for the duration of the sleep.

13. The method of claim 2, wherein the performing the sleep includes disabling selected ones of RF circuitry for the duration of the sleep.

14. The method of claim 2, further comprising:

generating an interrupt after waking up from the sleep.

15. The method of claim 14, wherein the interrupt is generated by hardware when clocks are re-enabled at wakeup.

16. The method of claim 14, wherein the interrupt is generated in response to completion of a signal search after wakeup.

17. The method of claim 16, wherein the signal search is programmed prior to entering the sleep.

18. The method of claim 2, wherein the sleep condition is identified if a time period between a current time and a next processing time exceeds a particular time threshold.

19. The method of claim 2, wherein the communication system is a CDMA system.

20. The method of claim 19, wherein the CDMA system implements IS-95 or cdma2000 standard.

21. A memory communicatively coupled to a digital signal processing device (DSPD) capable of interpreting digital information to:

identify a sleep condition; and initiate a sleep of a duration that is a non-integer multiple of a length of a PN sequence used to spread the data prior to transmission, wherein a fractional part of the sleep duration is less than a quarter PN sequence length.

22. A terminal in a wireless communication system comprising:

a first controller operative to identify a sleep condition; and a sleep controller operative to initiate a sleep of a duration that is a non-integer multiple of a length of a PN sequence used to spread the data prior to transmission, wherein a fractional part of the sleep duration is less than a quarter of PN sequence length.

23. The receiver unit of claim 22, further comprising:

a clock generator operative to disable clocks for selected circuitry within the terminal for the duration of the sleep.

24. The receiver unit of claim 22, further comprising:

a searcher element operative to provide an interrupt after wakeup from the sleep.

25. The receiver unit of claim 22, further comprising:

at least one finger processor operative to provide a PN roll event from which system time for the terminal may be reset to.

* * * * *